United States Patent [19]

Woolsey

[11] Patent Number: 4,706,445
[45] Date of Patent: Nov. 17, 1987

[54] HAY BALER CONVERSION KIT

[75] Inventor: Charles F. Woolsey, Hobbs, N. Mex.

[73] Assignee: Blue Streak, Inc., Hobbs, N. Mex.

[21] Appl. No.: 855,126

[22] Filed: Apr. 23, 1986

[51] Int. Cl.⁴ .................... A01D 34/43; A01D 39/00; A01D 43/02

[52] U.S. Cl. ...................................... 56/14.7; 56/341; 180/11

[58] Field of Search ............. 56/14.7, 228, 341, 473.5, 56/15.1, 15.6, 2; 280/411 C, 415 R, 473; 180/11-13, 321

[56] References Cited

U.S. PATENT DOCUMENTS

| | | | |
|---|---|---|---|
| 1,496,364 | 6/1924 | Bonnafoux | 56/341 |
| 2,674,839 | 4/1954 | Russell | 56/341 |
| 2,754,652 | 7/1956 | Gilder | 56/14.7 |
| 2,888,088 | 5/1959 | Claas et al. | 56/14.7 |
| 3,693,332 | 9/1972 | Bobard | 56/2 |
| 3,985,394 | 10/1976 | Rolfes | 180/321 |
| 4,534,432 | 8/1985 | Weichel | 180/11 |

Primary Examiner—Stephen J. Novosad
Assistant Examiner—Bruce M. Kisliuk
Attorney, Agent, or Firm—Wendell Coffee

[57] ABSTRACT

A hay baler conversion unit includes internal combustion engine over steered drive wheels. The frame of a regular tractor drawn hay baler is attached to the frame of a conversion kit. An operator's station connected to the baler has controls for controlling the speed of the baler and also the speed the unit moves over the ground. The drive for the baler and for the drive wheel is a hydraulic pump and motor system. The operator's station is located behind the gatherer of the baler so that the operator has excellent view of the gatherer and is also adjacent to and laterally of the tying unit or knotter of the baler so that the operator is within view and reach of the knotter.

7 Claims, 5 Drawing Figures

HAY BALER CONVERSION KIT

RIGHTS TO INVENTIONS UNDER FEDERAL RESEARCH

There was no federally sponsored research and development concerning this invention.

BACKGROUND OF THE INVENTION (1) Field of the Invention

This invention relates to agricultural harvesting; and more particularly, to baling hay.

(2) Description of the Related Art

Regular tractor drawn balers (hay balers to be towed behind tractors) have been developed to a high degree of efficiency. When used herein, the term baler is used to mean that type of baler which compresses the hay into a bale which is a block, meaning that it has rectangular top, side, and end. Also, when used herein, the term wire is used to mean that material which is used to bind or tie such a bale. A large number of these tow type balers have been manufactured and sold. There is a large market for hay balers of this variety; resulting in hay balers being available at competitive costs.

Before this invention, baling hay was well known. Traditionally, the hay baler was drawn through the field by a tractor connected to it. This had many disadvantages. The farmer on the tractor was in front of the baling operating and in a poor position to closely monitor the hay as it was picked up; and particularly, the tying mechanism or knotter by which the bales were tied.

The hay is often not uniform when grown. I.e., some parts of the hay field are more productive than others, resulting in parts of a window having large amounts of hay. In other parts of the same windrow, the hay would not be so bountiful. It is desirable for the baler to move faster in thin hay and slower in heavy hay. Normally, with the towing vehicle, it is difficult for the towing vehicle to change speeds quickly to adapt to this, even if the farmer, from his forward position could monitor and readily perceive when change of speeds were desirable.

Expensive heavy tractors have automatic transmissions by which the speed can be changed without stopping the tractors. However, this is not the type of tractor which normally is used to tow hay balers at the present time. Normally, lighter, less expensive tractors are used to tow the hay baler through the field, and these smaller, less expensive tractors must be stopped to change ground speed.

In an effort to at least partially overcome these problems, many self propelled hay balers have been manufactured. Normally, self propelled unites are expensive.

Before this application was filed, the applicant was aware of the following U.S. Patents:

| Name | U.S. Pat. No. |
| --- | --- |
| Bonnafoux | 1,496,364 |
| Keller | 2,611,227 |
| Russell | 2,627,159 |
| Russell | 2,674,839 |
| Gilder | 2,754,652 |
| Solterbeck | 3,885,375 |

SUMMARY OF THE INVENTION (1) Progressive Contribution to the Art

I have invented a conversion kit whereby towed type balers may be readily converted to self propelled balers.

My conversion kit will bolt onto a normal towed type hay baler, using its wheels for the support of the baling portion of the unit. The conversion kit has an internal combustion engine connected to at least one hydraulic pump. The engine is mounted over a pair of drive wheels which are driven from the hydraulic pump, and also steered, for guidance purposes. In addition to this, there is support framework to extend from the power unit to support the hay baler, whereas normally this is done by a tongue connected to a towing vehicle. An operator station is placed in its most advantageous position for the operator together with hydraulic controls to control independently the speed at which the vehicle moves along the windrow, and also, the speed at which the baler operates.

Controls for the hydraulic motors are provided at the operator's station. Obviously, the station includes a steering means so that the drive wheels can be steered from the operator's position. Also, the station contains speed and reverse control for the drive wheels. Therefore, the speed of the machine along the ground can be regulated by the operator by merely changing the flow of hydraulic fluids. In addition to this, the speed or strokes per minute of the baler itself may be controlled from the station.

Thus the operator has more control over the quality of the bales. E.g., the farmer may be baling a very rough and bumpy field with spotty hay, having 200 feet of windrow that has 1½ ton per acre and then 300 feet with only ½ ton per acre. Since the field is too rough to speed up enough in the thin hay to keep the baler case full at 80 strokes per minute; the farmer can bring the baler speed variable control to 40 or 50 strokes per minute, resulting in more evenly packed bales and much less wear and tear on the baler. The baler is kept running over the ground at maximum speed for the terrain. Underloading the baler is much harder and more damaging to the baler than overloading the baler.

This invention, besides being adaptable as a conversion kit is adapted for a small manufacturing shop or assembly shop. I.e., except for the frame and the operator's station, standard components and parts are used. I.e., the internal combustion engine is commercially available on the market as is the hydraulic pump or pumps. The preferred pump is one with a static transmission using a swash plate having variable displacement with an over the center reversible axial piston pump. Engines and pumps of this nature are readily available on the market from different manufacturers. In addition, the hydraulic motors to steer the vehicle; to provide power for driving the vehicle along the windrow; and also to power the baler itself are all readily available on the market. The control units having remote cables to the operator's station are all readily available on the market from more than one manufacturer. As stated before, the most reliable, commonly used, proven baler, the tow type baler is used.

With the combination as assembled according to this invention, the operator is positioned at the most advantageous position, away from the noise of the internal combustion engine and with the gathering mechanism directly in his view, and also with the tying mechanism or knotter well within his view and reach from his normal operating position. With a machine according to this invention, the operator is able to make more hay into better quality bales than with a towed baler. Also, he is able to make as many bales of hay at far less expense than an operator with a self propelled baler as is commercially available on the market today.

(2) Object of this Invention

An object of this invention is to bale hay.

Further objects are to achieve the above with a machine that is sturdy, compact, durable, lightweight, simple, safe, fast, efficient, versatile, ecologically compatible, energy conserving, and reliable, yet inexpensive and easy to manufacture, assemble, adjust, operate and maintain.

The specific nature of the invention, as well as other objects, uses, and advantages thereof, will clearly appear from the following description and from the accompanying drawing, the different views of which are not scale drawings.

Figure 1:
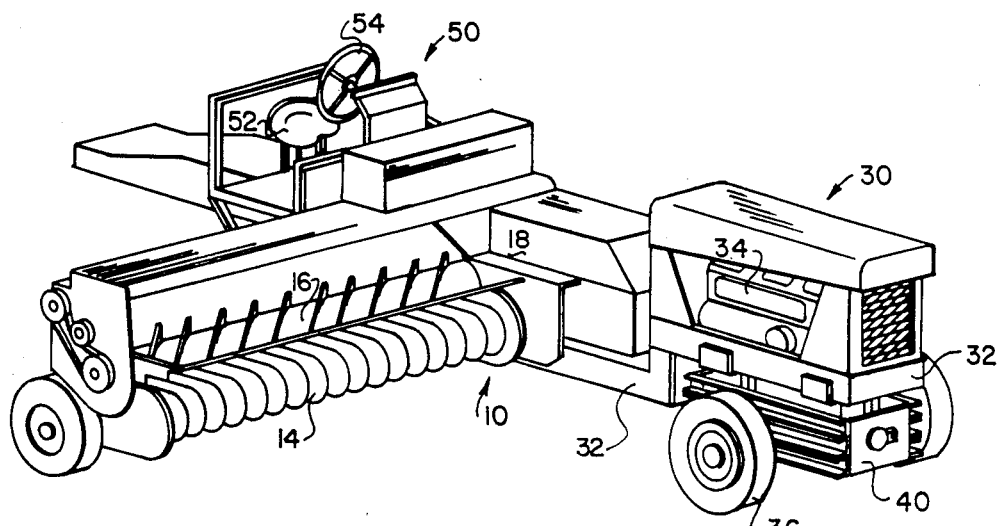
FIG. 1 is an isometric view of a baler according to my invention.
Figure 2:
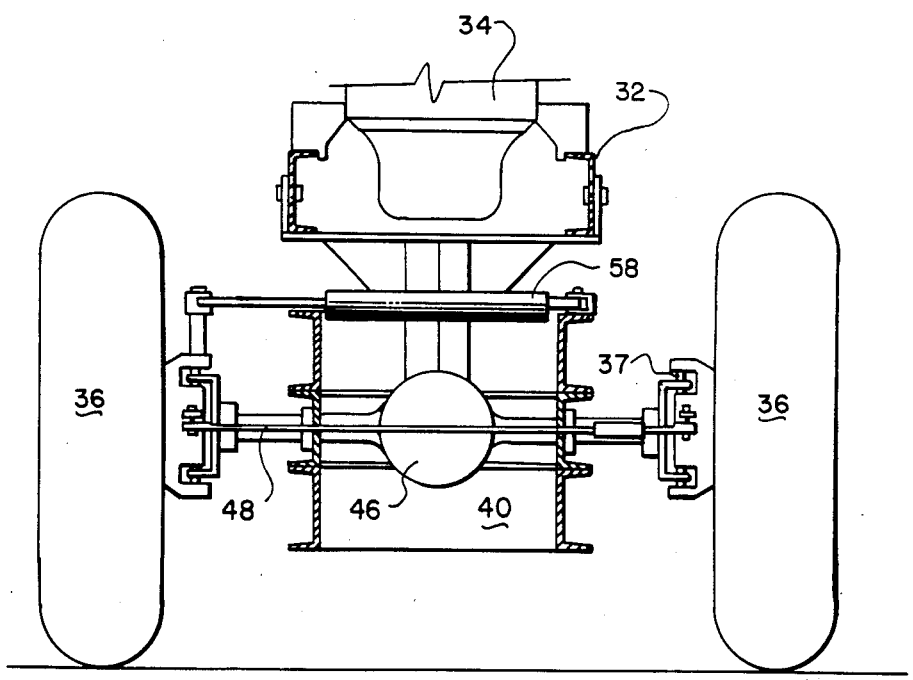
FIG. 2 is a sectional detail of the wheel frame pivoted to the conversion frame taken substantially on line 2—2 of FIG. 3.
Figure 3:
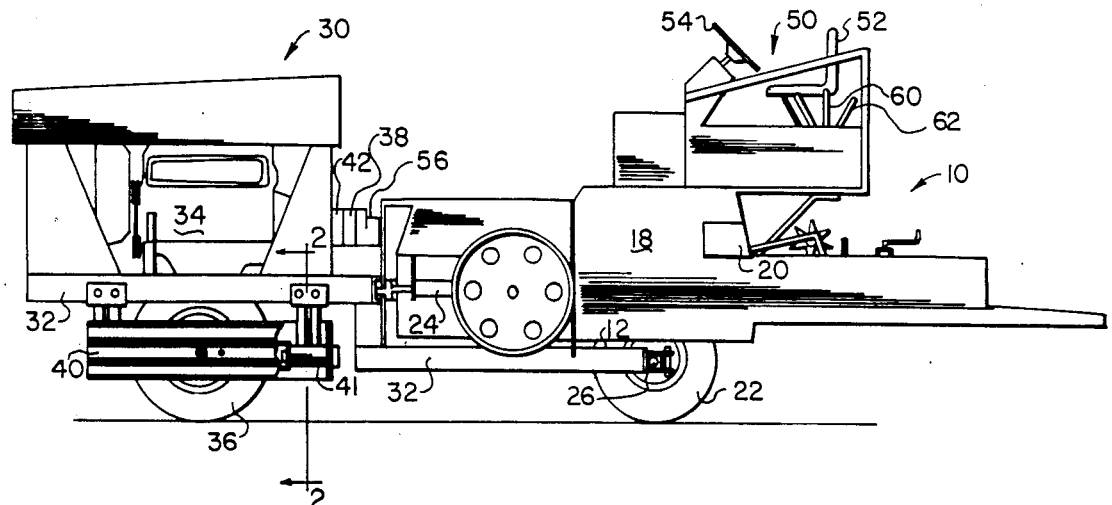
FIG. 3 is a side elevational view of the complete assembly, particularly showing the operating station adjacent to and laterally offset from the knotter behind the press.
Figure 4:
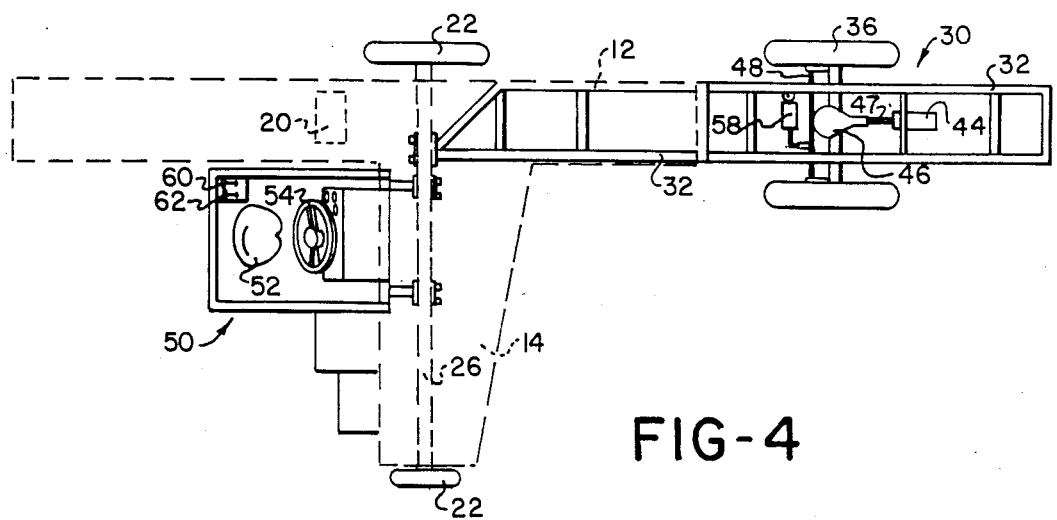
FIG. 4 is a schematic or phantom top view.

As an aid to correlating the terms of the claims to the exemplary drawing, the following catalog of elements and steps is provided:

10 hay baler
12 baler frame
14 gatherer
16 conveyor
18 press
20 knotter
22 ground engaging wheels
24 baler transmission means
26 axle
30 conversion unit
32 conversion frame
34 engine
36 drive wheel
37 king pin
38 hydraulic baler pump
40 wheel frame
41 pins
42 hydraulic drive pump
44 drive motor
46 differential
47 drive shaft
48 steering means
50 operator station
52 seat
54 steering wheel
55 steering valves
56 steering pump
58 steering motor
60 baler control
62 speed control
64 hydraulic baler motor
66 hoses
68 control cables

DESCRIPTION OF THE PREFERRED EMBODIMENT

Referring to the drawing, it may be seen that this invention utilizes a conventional tow type hay baler 10. By tow type hay baler 10, is meant, a regular tractor drawn baler. The baler 10 will have baler frame 12 with gatherer 14 on the frame to gather hay from the windrow. Conveyor 16 on the frame moves the gathered hay to press 18. The press is the name given to that composite mechanism which compresses the gathered hay into a bale. Tying unit or knotter 20 on the press 18 knots the wire that has been wrapped around the compressed bale. Ground engaging wheels 22 on axle 26 of the frame permit the baler 10 to be moved along the windrow to pick up the hay. Mechanical baler power transmission means 24 transfers power from the towing vehicle to the baler 10.

Those having skill in the art will understand that the baler normally would have a tongue on the frame so that the baler 10 could be connected to the towing vehicle. However, for the purposes of this invention, any tongue or hitch on the baler is removed.

Also, those having ordinary skill in the art will recognize that what is called here a tow type hay baler is a well developed commonly available piece of farm machinery that has been on the market for many years.

According to this invention, conversion kit 30 is provided so that conversion frame 32 of the unit 30 may be bolted to the baler frame 12 and axle 26 so that then the conventional towed baler is made into a self propelled baler.

The conversion kit 30 includes internal combustion engine 34 which is mounted upon the conversion frame 32. The engine 34 will be over drive wheel 36 on wheel frame 40. The drive wheel is so called because it is connected to the engine 34 by conversion transmission means so that power can be transmitted to the wheel and the wheel be used to drive the baler along the windrow. The drive wheel 36 is also a steering wheel. I.e., the spindle to which the drive wheel 36 is journaled is itself mounted for movement on king pin 37 so that the unit may be steered or guided as it moves along the ground.

The wheel frame 40 normally is basically in a horizontal plane. Horizontal pins 41 at the front and rear of the wheel frame pivot the wheel frame to the conversion frame 32. Convenient ears or post extend downward from the conversion frame 32 to supports the pins 41 so that the wheels can operate at different elevations with the ground engaging wheels 22 on the baler frame 12 still maintaining the baler frame in its proper orientation to the ground.

The preferred conversion transmission means includes hydraulic drive pump 42 and baler pump 38 mounted on the conversion frame 32 and mechanically connected to the engine 34. The drive pump 42 is connected by hoses 66 and other hydraulic equipment to hydraulic drive motor 44 mounted on wheel frame 40. The hydraulic drive motor 44 is mechanically connected to the drive wheel 36 to drive the same.

As may be seen in the drawing, there are two of the drive wheels 36 spaced apart, connected with a right angle differential 46. The drive shaft 47 of differential 46 is mechanically connected to the drive motor 44. However, those having ordinary skill in the art will understand that a single drive wheel 36 could be used rather than the pair as shown in this preferred embodiment.

Likewise, in the preferred embodiment, there is an automotive type steering mechanism or means 48 used to connect the spindles to the axle from the differential 46.

As a practical matter, I have found that front end units from four wheel drive vehicles are adapted for this purpose. I.e., the drive wheels 36, differential 46, and steering means 48 are all readily available as a single unit from automotive type four wheel drive vehicles. Of course, it is desirable to use a heavy duty type vehicles inasmuch as the drive wheels 36 are the main support for the internal combustion engine.

Operator station 50 is mounted upon axle 26 of the frame 12. The operator station includes seat 52 for the convenience of a farmer in operation. The station, and more particularly the seat, is located so that in normal operation the farmer is laterally adjacent to the knotter 20. Experience has shown that the knotter 20 is a crucial operating portion of the baler and the one unit most likely to need attention and manual adjustment. Therefore, I find it desirable to locate the operator within easy view and reach of the knotter 20 from his normal operating position. Also, in his normal operating position, the operator can maintain good visual surveillance over the gatherer 14 as it gathers hay from the windrow.

Steering wheel 54 is located just forward of the seat 52. The steering wheel is connected to hydraulic steering valves 55 known in the art. These valves are commercially available on the market and are used to connect by hoses 66 separate steering pump 56 to steering motor 58. The steering pump 56 is mechanically drive by the engine 34.

Baler control 60 for variable speed baler pump 38 is located at the operator station 50. Drive control 62 for variable speed drive pump 42 is provided at operator station 50. The variable speed drive pump 42 forms part of the control means for driving and reversing the drive wheel 36. Light switches, brakes, engine indicators and controls also would be present at the operator station; however, those with ordinary skill in the art will understand the need and presence of these controls.

Figure 5:
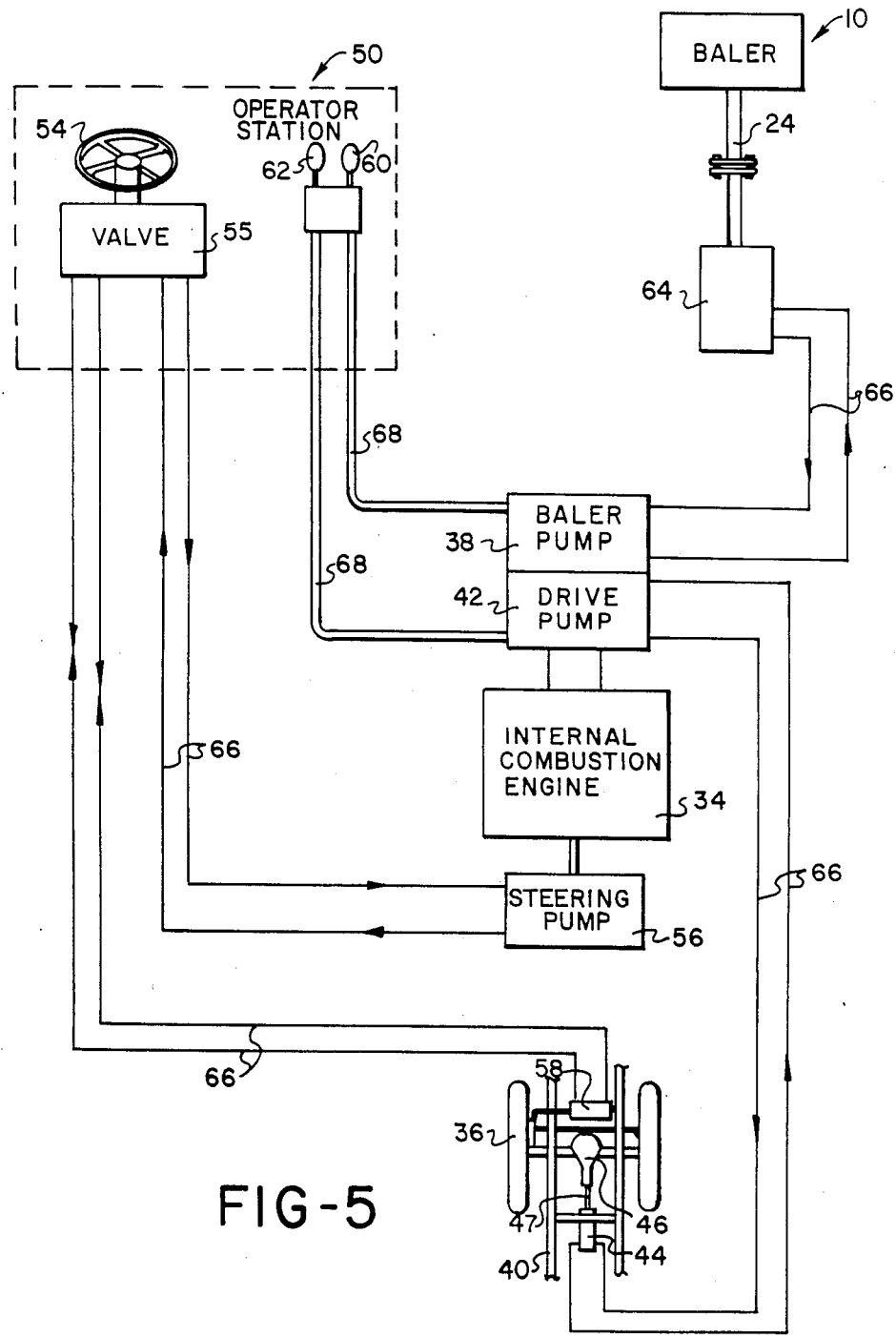
FIG. 5 is a schematic of the hydraulic circuits.

Referring to the hydraulic schematic, FIG. 5, it may be seen how the various parts are connected. Hydraulic baler motor 64 is attached to the baler frame 12 and used to furnish power to the baler 10. The baler motor 64 may be connected to the baler transmission means 24 by any conventional means, such as directly connecting the shaft from motor 64 to the shaft of the transmission 24, or by a belt, or by other conventional mechanical power transmission means. The schematic drawing is not meant to be completely representative of the type mechanism used.

Those with ordinary skill in the art will understand that conventional hydraulic hoses 66 are used to connected baler pump 38 to baler motor 64 and to connect drive pump 42 to drive motor 44 and also to connect steering pump 56 to steering valve 55 and to steering motor 58. Also, it is well known in the art that the type of variable displacement swash plate pumps that are used are readily controlled by control cables 68 that extend from the baler control 60 to the baler pump 38 and from drive control 62 to drive pump 42.

Also, those with ordinary skill will understand that the conventional swash plate variable displacement pumps can be readily reversed so that they pump the fluid in the reverse direction, which in this instance will result in the reversing of the direction of drive wheels 36.

Furthermore, the particular type pump will have small reservoirs, coolers, and make up pumps; although primarily the fluid is circulated directly to and from the motor. The reservoirs, coolers, and make up pumps have not been shown in the drawings for clarity.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A conversion unit for a tow type hay baler having
   a. a baler frame,
   b. an axle on the frame,
   c. a gatherer on the frame to gather hay from a windrow,
   d. a conveyor on the frame to move the gathered hay to
   e. a press on the frame to compress the hay into a bale,
   f. a knotter on the press to knot wire that has been wrapped around the compressed bale,
   g. ground engaging wheels on the axle for moving the baler along windrows, and
   h. mechanical baler power transmission means on the baler for transferring power to the baler;
   comprising:
   i. a conversion frame,
   j. an internal combustion engine on the conversion frame,
   k. at least one ground engaging steered and drive wheel journaled about a horizontal spindle,
   l. steering means interconnecting the spindle and conversion frame for supporting, driving, and steering the conversion frame by the drive wheel,
   m. connection means on the conversion frame for connecting the conversion frame to said baler frame so that the conversion frame may be supported in part by the baler frame,
   n. conversion transmission means on the conversion frame for transferring power to the drive wheel and adapted to transfer power to the baler power transmission means.

2. The invention as defined in claim 1 with the addition of:
   o. an operator's station adapted to be attached to the baler frame,
   p. said operator's station adapted to be located behind the gatherer and laterally adjacent to the knotter,
   q. said operator's station including means for steering the steered wheel; for controlling the power transferred to the drive wheel, and therefore, controlling the speed of the drive wheel; and for controlling the power adapted to be transferred to the baler power transmission means.

3. The invention as defined in claim 1 further comprising:
   o. said conversion transmission means including at least one hydraulic pump mechanically connected to said internal combustion engine, p. a hydraulic motor connected to said drive wheel for rotating said drive wheel, q. a hydraulic motor attached to said drive wheel for steering said wheel, and r. a hydraulic motor adapted to be connected to said baler power transmission means.

4. The invention as defined in claim 1 further comprising:

o. said conversion frame connected to said baler frame, and p. said conversion transmissin means connected to said baler power transmission means.

5. The invention as defined in claim 4 with the addition of:

r. an operator's station attached to the baler frame, s. said operator's station located behind the gatherer and laterally adjacent to the knotter, t. said operator's station including means for steering the steered wheel; for controlling the power transferred to the drive wheel, and therefore, controlling the speed of the drive wheel; and for controlling the power transferred to the baler power transmission means.

6. The invention as defined in claim 5 further comprising:

u. said conversion transmission means including at least one hydraulic pump mechanically connected to said internal combustion engine, v. a hydraulic motor connected to said drive wheel for rotating said drive wheel, w. a hydraulic motor attached to said drive wheel for steering said wheel, and x. a hydraulic motor connected to said baler power transmission means.

7. On a self propelled hay baler having:

a. a baler frame, b. a baler axle on the frame, c. a gatherer on the frame to gather hay from a windrow, d. a conveyor on the frame to move the gathered hay to e. a press on the frame to compress the hay into the bale, f. a knotter on the press to knot wire that has been wrapped around the compressed bale, g. ground engaging wheels on the axle for moving the baler in a direction of travel along windrows, and h. mechanical baler power transmission means for transferring power to the baler, the improved structure comprising:

i. a conversion frame, j. said conversion frame connected to said baler frame, k. a wheel frame journaled to said conversion frame about an axis aligned with the direction of travel along windrows, l. a pair of drive wheels journaled for rotation to said wheel frame, m. differential means for transmitting the power from a single drive shaft to said drive wheels, n. a hydraulic drive motor connected to said drive shaft, o. steering means interconnecting said drive wheels and wheel frame, p. a hydraulic steering motor connected to said steering means, q. an internal combustion engine mounted on said conversion frame over said wheel frame, r. a hydraulic drive pump mechanically connected to said internal combustion engine, s. a hydraulic steering pump mechanically connected to said internal combustion engine, t. a hydraulic baler pump mechanically connected to said internal combustion engine, u. a hydraulic baler motor connected to said mechanical baler power transmission means, v. hydraulic hoses connecting the drive motor to the drive pump and the baler motor to the baler pump, w. an operator's station attached to the baler axle behind the gatherer and adjacent to and laterally positioned from said knotter, x. a hydraulic steering control valve with y. means for controlling same attached to said operator's station, z. hydraulic hoses connecting said hydraulic steering pump to said steering motor and said steering control valve, aa. a mechanical baler control link on the operator's station for controlling said baler pump, and bb. a mechanical drive control link on the operator's station for controlling said drive pump.

* * * * *